(12) United States Patent
Emaru

(10) Patent No.: US 9,608,933 B2
(45) Date of Patent: Mar. 28, 2017

(54) METHOD AND SYSTEM FOR MANAGING CLOUD COMPUTING ENVIRONMENT

(71) Applicant: Hitachi, Ltd., Chiyoda-ku, Tokyo (JP)

(72) Inventor: Hironori Emaru, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 636 days.

(21) Appl. No.: 13/749,626

(22) Filed: Jan. 24, 2013

(65) Prior Publication Data

US 2014/0207944 A1    Jul. 24, 2014

(51) Int. Cl.
G06F 15/173    (2006.01)
H04L 12/911   (2013.01)
H04L 12/927   (2013.01)

(52) U.S. Cl.
CPC ............ H04L 47/78 (2013.01); H04L 47/803 (2013.01)

(58) Field of Classification Search
CPC ..... H04L 41/0813; H04L 41/08; H04L 43/08; H04L 43/16; G06F 11/3003; G06F 11/3051; G06F 11/3438; G06F 11/3447; G06F 9/45533; G06F 9/45537; H04W 72/048; H04W 72/0486; H04W 72/08
USPC ...................... 709/224, 223, 226; 718/104, 1
See application file for complete search history.

(56) References Cited

U.S. PATENT DOCUMENTS 7,281,018 B1 * 10/2007 Begun et al.
7,565,656 B2 *  7/2009 Yamasaki et al. ............ 718/104
7,596,784 B2 *  9/2009 Abrams et al. ................ 717/172
8,006,134 B2 *  8/2011 Nammatsu et al. ............ 714/26
8,037,215 B2 * 10/2011 Gunnels et al. ................ 710/22
8,112,586 B1 *  2/2012 Reiner et al. ................. 711/122
8,261,266 B2 *  9/2012 Pike et al. ......................... 718/1
8,266,254 B2 *  9/2012 Garrison et al. .............. 709/220
8,347,263 B1 *  1/2013 Offer ............................. 717/104
8,352,608 B1 *  1/2013 Keagy et al. .................. 709/226
8,370,835 B2 *  2/2013 Dittmer ............................ 718/1
8,473,615 B1 *  6/2013 Rowland et al. ............. 709/226
8,543,778 B2 *  9/2013 Emaru et al. .................. 711/154
8,601,471 B2 * 12/2013 Beaty et al. ...................... 718/1
8,601,483 B2 * 12/2013 He et al. ........................ 718/104
8,683,340 B2 *  3/2014 Wilkins ......................... 715/731
8,756,600 B2 *  6/2014 Mori ................................. 718/1
8,756,609 B2 *  6/2014 Dasgupta et al. ............ 718/105
8,825,817 B1 *  9/2014 Jaisinghani et al. .......... 709/221
8,856,783 B2 * 10/2014 Sharp et al. ...................... 718/1
8,918,585 B2 * 12/2014 Naganuma et al. .......... 711/114

(Continued)

*Primary Examiner* — Joshua Joo
*Assistant Examiner* — Younes Naji

(57) ABSTRACT

A management server manages resources in a cloud system having servers and storage subsystems by assigning a category of resources to an application, the category of resources being associated with a first template of virtualized resources, the first template being associated with threshold values and having a first cost for using the first template; monitoring performance of the first template to obtain performance values for the first template; comparing a first performance value of the first template with a first threshold value associated with the first template; and generating a plan for migrating the application to a second template based upon a result of the comparison. The second template is associated with a second threshold value that is greater than the first performance value. The second template has a second cost for using the second template that is less than the first cost.

20 Claims, 18 Drawing Sheets

(56) References Cited

U.S. PATENT DOCUMENTS

| | | | |
|---|---|---|---|
| 2006/0025985 A1* | 2/2006 | Vinberg et al. | 703/22 |
| 2007/0094668 A1* | 4/2007 | Jacquot et al. | 718/104 |
| 2008/0294777 A1* | 11/2008 | Karve et al. | 709/226 |
| 2010/0036698 A1* | 2/2010 | Garrison et al. | 705/8 |
| 2010/0110933 A1* | 5/2010 | Wilcock et al. | 370/255 |
| 2011/0145392 A1 | 6/2011 | Dawson et al. | |
| 2011/0209146 A1* | 8/2011 | Box et al. | 718/1 |
| 2011/0231899 A1 | 9/2011 | Pulier et al. | |
| 2011/0258621 A1* | 10/2011 | Kern | 718/1 |
| 2012/0011510 A1* | 1/2012 | Yamakabe et al. | 718/1 |
| 2012/0079097 A1 | 3/2012 | Gopisetty et al. | |
| 2012/0089980 A1* | 4/2012 | Sharp et al. | 718/1 |
| 2012/0110572 A1 | 5/2012 | Kodi et al. | |
| 2012/0116849 A1 | 5/2012 | Thiele et al. | |
| 2012/0151476 A1* | 6/2012 | Vincent | 718/1 |
| 2012/0227039 A1* | 9/2012 | Ferdman et al. | 718/1 |
| 2012/0331114 A1* | 12/2012 | Garg | G06Q 10/00 709/220 |
| 2013/0007265 A1* | 1/2013 | Benedetti et al. | 709/224 |
| 2013/0014107 A1* | 1/2013 | Kirchhofer | 718/1 |
| 2013/0054426 A1* | 2/2013 | Rowland et al. | 705/27.2 |
| 2013/0097304 A1* | 4/2013 | Asthana et al. | 709/224 |
| 2013/0103829 A1* | 4/2013 | Doi et al. | 709/224 |
| 2013/0138812 A1* | 5/2013 | Assuncao | G06F 9/50 709/226 |
| 2013/0185413 A1* | 7/2013 | Beaty et al. | 709/224 |
| 2013/0219391 A1* | 8/2013 | Lee et al. | 718/1 |
| 2013/0232498 A1* | 9/2013 | Mangtani et al. | 718/104 |
| 2013/0311645 A1* | 11/2013 | Nagami et al. | 709/224 |
| 2013/0326053 A1* | 12/2013 | Bauer et al. | 709/224 |
| 2014/0007093 A1* | 1/2014 | Deshpande et al. | 718/1 |
| 2014/0079207 A1* | 3/2014 | Zhakov et al. | 379/265.03 |
| 2014/0156813 A1* | 6/2014 | Zheng et al. | 709/220 |
| 2014/0172406 A1* | 6/2014 | Baset et al. | 703/22 |

\* cited by examiner

| | 3010 | 3020 |
|---|---|---|
| | Storage | Physical Volume (Tier, Capacity) |
| 3100 | SUB-01 | RG-011(SAS 10), RG-012 (SATA 20), RG-060 (SSD4), RG-062 (SAS 20), RG-063 (SATA 50) |
| 3105 | SUB-05 | RG-055(SAS 50), RG-056(SATA 50) RG-022 (SATA 100) |
| 3110 | SUB-09 | RG-201(SSD 8), RG-202(SAS 100) RG-100(SSD 16), RG-103(SAS 50) |

| | 4010 | 4020 | 4030 | 4040 |
|---|---|---|---|---|
| | Server | CPU (# of core, Type) | GPU | Memory |
| 4100 | SVR-01 | 48 Core, High | 0 | 128 GB |
| 4105 | SVR-02 | 96 Core, High | 4 | 256 GB |
| 4110 | SVR-05 | 24 Core, High | 0 | 256 GB |
| 4115 | SVR-10 | 12 Core, Normal | 4 | 32 GB |
| 4120 | SVR-12 | 4 Core, High | 0 | 8 GB |
| 4125 | SVR-20 | 48 Core, High | 0 | 64 GB |
| 4130 | SVR-24 | 48 Core, High | 0 | 64 GB |

| | Template | | # of VMs | Media | | Monitoring Item / Threshold | | | | |
|---|---|---|---|---|---|---|---|---|---|---|
| ID | Name | VM Type | | Type | Capacity (TB) | CPU Usage | Memory Usage | Disk Usage | Latency (msec) | IOPS |
| 1 | OLTP High | High CPU | 4 | High | 3 | 75% | - | 75% | 20 | - |
| 2 | OLTP Mid | High CPU | 2 | High | 5 | 90% | - | 75% | 30 | - |
| 3 | OLAP | High I/O | 1 | Extra | 20 | - | - | 75% | - | 125000 |
| | | High Memory | 1 | Mid | 15 | - | 80% | 75% | - | - |
| | | Normal | 2 | Normal | 2 | - | - | 80% | - | - |
| 4 | Web | High Memory | 1 | Mid | 5 | - | 80% | 75% | - | - |
| | | High CPU | 1 | High | 10 | 85% | - | 75% | 5 | - |
| 5 | Mail - 500box | High I/O | 4 | Mid | 8 | - | - | 85% | - | 90000 |
| 6 | Dev/Test | Normal | 2 | Normal | 2 | - | - | 90% | - | - |

Fig. 6

| | | 7010 | 7020 | 7030 | 7040 |
|---|---|---|---|---|---|
| 7110 | VM Type | Normal | High Memory | High CPU | High I/O |
| 7115 | VM Type ID | 1 | 2 | 3 | 4 |
| 7120 | Processor Type | Normal | High | GPU | High |
| 7130 | Processor Performance | 1 | 10 | 20 | 10 |
| 7140 | # of Processors | 2 | 8 | 16 | 16 |
| 7150 | Memory | 4GB | 32GB | 8GB | 8GB |
| 7160 | Max IOPS | 50,000 | 100,000 | 100,000 | 500,000 |
| 7170 | Unit Price | 10 | 30 | 80 | 90 |

| | 8010 | 8020 | 8030 | 8040 |
|---|---|---|---|---|
| 8110 Media Type | Normal | Mid | High | Extra |
| 8115 Media Type ID | 1 | 2 | 3 | 4 |
| 8120 Media | SATA | SAS | SSD(20%) / SAS(80%) | SSD |
| 8130 IOPS / Unit Capacity | 5,000 | 10,000 | 28,000 | 100,000 |
| 8140 Unit Price | 3 | 5 | 20 | 30 |

| 9010 | Application Type: | [dropdown] |
| 9020 | Application Name: | [text field] |
| 9030 | Size: | [dropdown] |
| 9040 | Period: | [field] Days [dropdown] |

Confirm — 9110
Cancel — 9120

| | | |
|---|---|---|
| 10010 | Application Type: | Mail-500box |
| 10020 | Application Name: | Mail-A |
| 10030 | Size: | 500 Mailbox |
| 10040 | Period: | 2 Years |

10200 Provisioned VM:

| | VM Name | CPU | Memory | Media |
|---|---|---|---|---|
| 10210 | Mail-A-1 | 16 x High | 8GB | 2TB / SSD+SAS |
| 10220 | Mail-A-2 | 16 x High | 8GB | 2TB / SSD+SAS |
| 10230 | Mail-A-3 | 16 x High | 8GB | 2TB / SSD+SAS |
| 10240 | Mail-A-4 | 16 x High | 8GB | 2TB / SSD+SAS |

10250 / 10260 / 10270 / 10280

10050 Unit Cost: 400

| OK | Cancel | Back |
|---|---|---|
| 10110 | 10120 | 10130 |

Fig. 10

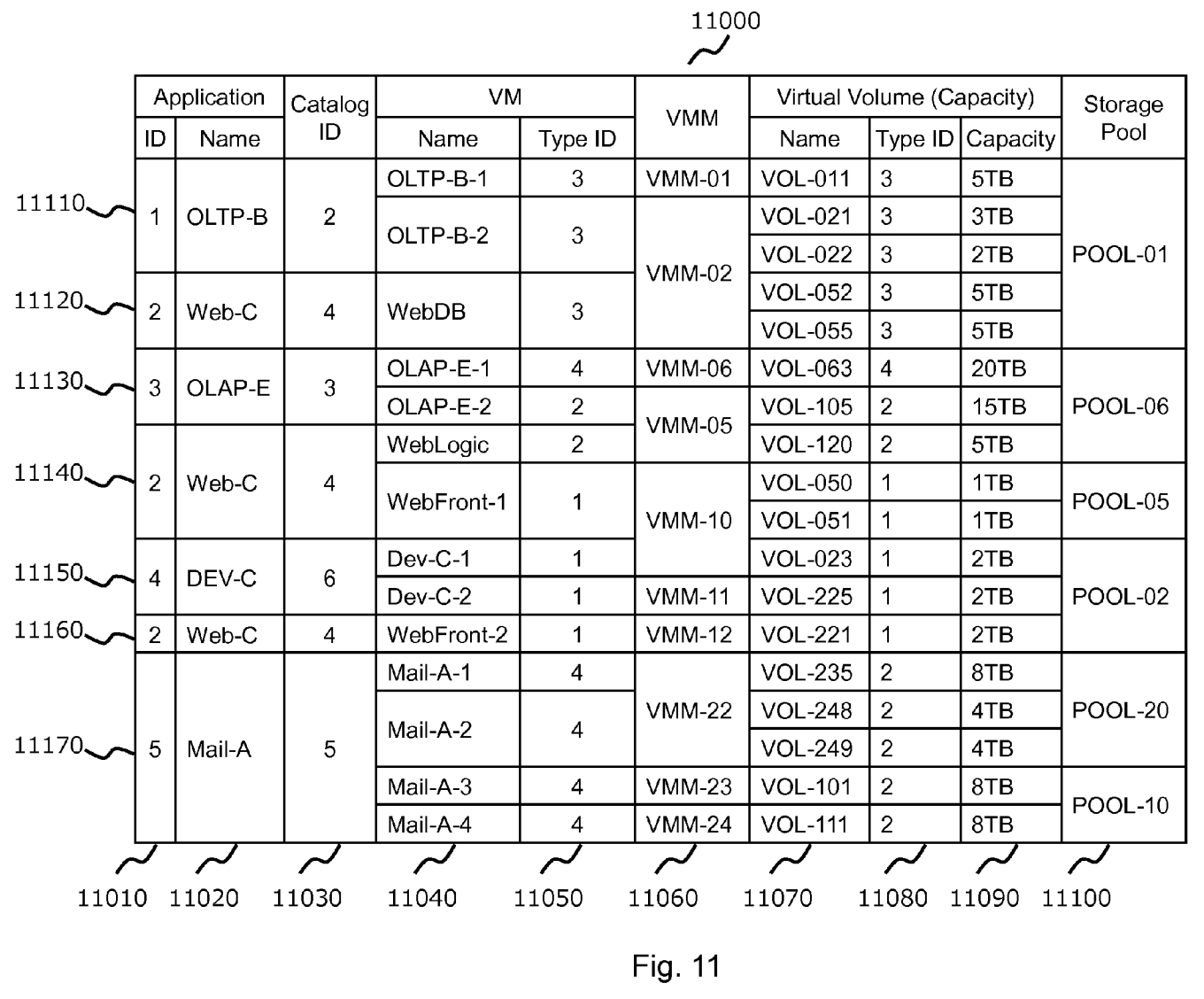

| Application | | Catalog ID | VM | | VMM | Virtual Volume (Capacity) | | | Storage Pool |
|---|---|---|---|---|---|---|---|---|---|
| ID | Name | | Name | Type ID | | Name | Type ID | Capacity | |
| 1 | OLTP-B | 2 | OLTP-B-1 | 3 | VMM-01 | VOL-011 | 3 | 5TB | POOL-01 |
| | | | OLTP-B-2 | 3 | VMM-02 | VOL-021 | 3 | 3TB | |
| 2 | Web-C | 4 | WebDB | 3 | | VOL-022 | 3 | 2TB | |
| | | | | | | VOL-052 | 3 | 5TB | |
| | | | | | | VOL-055 | 3 | 5TB | |
| 3 | OLAP-E | 3 | OLAP-E-1 | 4 | VMM-06 | VOL-063 | 4 | 20TB | POOL-06 |
| | | | OLAP-E-2 | 2 | VMM-05 | VOL-105 | 2 | 15TB | POOL-05 |
| | | | WebLogic | 2 | | VOL-120 | 2 | 5TB | |
| 2 | Web-C | 4 | WebFront-1 | 1 | VMM-10 | VOL-050 | 1 | 1TB | |
| | | | | | | VOL-051 | 1 | 1TB | |
| 4 | DEV-C | 6 | Dev-C-1 | 1 | VMM-11 | VOL-023 | 1 | 2TB | POOL-02 |
| | | | Dev-C-2 | 1 | VMM-12 | VOL-225 | 1 | 2TB | |
| 2 | Web-C | 4 | WebFront-2 | 1 | | VOL-221 | 1 | 2TB | |
| 5 | Mail-A | 5 | Mail-A-1 | 4 | VMM-22 | VOL-235 | 2 | 8TB | |
| | | | Mail-A-2 | 4 | | VOL-248 | 2 | 4TB | POOL-20 |
| | | | | | | VOL-249 | 2 | 4TB | |
| | | | Mail-A-3 | 4 | VMM-23 | VOL-101 | 2 | 8TB | POOL-10 |
| | | | Mail-A-4 | 4 | VMM-24 | VOL-111 | 2 | 8TB | |

Fig. 11

| VM Name | History | CPU Usage | | Memory Usage | Disk Usage | Latency | IOPS |
|---|---|---|---|---|---|---|---|
| | | CPU 0 | CPU 15 | | | | |
| Mail-A-2 | 0 | 14% | 22% | 98% | 65% | 30msec | 55,000 |
| | 1 | 15% | 18% | 95% | 70% | 24msec | 57,000 |
| | 2 | 14% | 19% | 97% | 76% | 27msec | 41,000 |
| | .. | .. | .. | .. | .. | .. | .. |

Fig. 13-A

| VM Name | History | CPU Usage | | Memory Usage | Disk Usage | Latency | IOPS |
| --- | --- | --- | --- | --- | --- | --- | --- |
| | | CPU 0 | CPU 15 | | | | |
| OLTP-B-2 | 0 | 53% | 39% | 44% | 62% | 28msec | 31,000 |
| | 1 | 65% | 68% | 52% | 68% | 25msec | 27,000 |
| | 2 | 54% | 45% | 51% | 67% | 27msec | 34,000 |
| | .. | .. | .. | .. | .. | .. | .. |

Fig. 13-B

| | Application | | Catalog ID | VM | | VMM | Virtual Volume (Capacity) | | | Storage Pool |
|---|---|---|---|---|---|---|---|---|---|---|
| | ID | Name | | Name | Type ID | | Name | Type ID | Capacity | |
| 14110 | 1 | OLTP-G | 2 | OLTP-G-1 | 2 | VMM-51 | VOL-511 | 3 | 2.5TB | POOL-51 |
| | | | | OLTP-G-2 | 2 | VMM-52 | VOL-521 | 3 | 2.0TB | |
| | | | | | | | VOL-522 | 3 | 0.5TB | |
| 14120 | 2 | OLTP-H | 2 | OLTP-H-1 | 2 | | VOL-552 | 3 | 1.5TB | |
| | | | | | | | VOL-555 | 3 | 1.0TB | |
| 14130 | 3 | OLTP-J | 2 | OLTP-J-1 | 2 | VMM-56 | VOL-563 | 3 | 2.5TB | POOL-56 |
| | | | | OLTP-J-2 | 2 | VMM-55 | VOL-605 | 3 | 2.5TB | |
| 14140 | 4 | OLTP-L | 2 | OLTP-L-1 | 2 | | VOL-620 | 3 | 2.5TB | |
| | | | | OLTP-L-2 | 2 | VMM-60 | VOL-550 | 3 | 1.0TB | POOL-55 |
| | | | | | | | VOL-551 | 3 | 1.5TB | |
| 14150 | 5 | OLTP-N | 2 | OLTP-N-1 | 2 | | VOL-523 | 3 | 2.5TB | POOL-52 |
| | | | | OLTP-N-2 | | VMM-61 | VOL-625 | 3 | 2.5TB | |
| 14160 | 2 | OLTP-H | 2 | OLTP-H-2 | 2 | VMM-62 | VOL-621 | 3 | 2.5TB | |
| 14170 | 6 | OLTP-K | 2 | OLTP-K-1 | 2 | VMM-72 | VOL-635 | 3 | 2.5TB | POOL-70 |
| | | | | OLTP-K-2 | 2 | | VOL-648 | 3 | 2.0TB | |
| | | | | | | | VOL-649 | 3 | 0.5TB | |
| 14180 | 7 | OLTP-M | 2 | OLTP-M-1 | 2 | VMM-73 | VOL-501 | 3 | 2.5TB | POOL-60 |
| | | | | OLTP-M-2 | | VMM-74 | VOL-511 | 3 | 2.5TB | |

| Time | VM Name | Event Type | From | To |
|------|---------|------------|------|-----|
| 15010 | 15020 | 15030 | 15040 | 15050 |
| 15 | OLAP-E-1 | VM Migration | 2 | 3 | ~ 15210
| 85 | WebFront-1 | Media Migration | 3 | 4 | ~ 15220
| 132 | Mail-A-2 | VM Migration | 3 | 2 | ~ 15230
| : | : | : | : | : |

| VM Name | History | CPU Usage | | | Memory Usage | Disk Usage | Latency | IOPS | Cost | |
|---|---|---|---|---|---|---|---|---|---|---|
| | | CPU 0 | ... | CPU 15 | | | | | | |
| Mail-A-2 | 130 | 14% | ... | 22% | 98% | 65% | 30msec | 55,000 | 130 | ~ 16210 |
| | 131 | 15% | ... | 18% | 95% | 70% | 24msec | 57,000 | 130 | ~ 16220 |
| | 132 | 14% | ... | 19% | 97% | 76% | 27msec | 41,000 | 130 | ~ 16230 |
| | 133 | 35% | ... | 38% | 25% | 74% | 21msec | 48,000 | 70 | ~ 16240 |
| | 134 | 34% | ... | 37% | 27% | 77% | 19msec | 49,000 | 70 | ~ 16250 |
| | : | : | ... | : | : | : | : | : | | |

Column labels: 13010, 13020, 13030, 13040, 13050, 13060, 13070, 16070
16200, 16000

Fig. 16

# METHOD AND SYSTEM FOR MANAGING CLOUD COMPUTING ENVIRONMENT

BACKGROUND

The present invention generally relates to methods and systems for managing resources in cloud computing environments.

Cloud computing is one of most rapidly growing areas in the information technology field. In cloud computing, computing resources including hardware and software are delivered as a service over network. There are a number of different types of cloud computing. Examples include but are not limited to Infrastructure as a Service (IaaS), Platform as a Service (PaaS), Software as a Service (SaaS), and the like.

A number of different solutions can be used to manage cloud computing environments. Typically, the cloud computing environment is managed based on role allotments, such as an infrastructure administrator, a virtualization administrator, an application administrator, and the like.

The infrastructure administrator typically manages the physical resources and provides them as resource pools for virtualization. The virtualization administrator typically manages the resource pools. The application administrator typically provisions the virtualized resources from the resource pools for executing certain application.

Generally, the options provided to the application administrator in the self-service portal setting are: Micro, Small, Medium, and Large, and the like. IT infrastructure, however, includes numerous hardware components that may not be easily packaged into one of these predefined service levels. For example, storage subsystems may include various media types such as HDD and SSD, and each of these media may be further categorized based on its speed, reliability, or other attributes. In addition, storage subsystems may provide various different functions (e.g. thin provisioning or dynamic tiering). Since a self-service portal typically only allows access to the virtualized resources, it may be difficult for the application administrator to provision the precise media type and service functions desired for a given application.

In a conventional cloud computing environment, it may also be difficult for the infrastructure administrator to provide feedback on resource usage and acquisition to the application administrator since the former manage the physical resources and the latter uses virtualized resources. Therefore, there is a need for means of monitoring the resource usage by applications and providing the monitored results to the application administrator, so that the application administrator may utilize the resources more effectively for given applications.

SUMMARY

The present invention relates to methods and systems for managing virtualized resources in a cloud computing environment. Embodiments of the invention allow for providing feedback to an application administrator in the form of a resource migration plan created by a management program. The resource migration plan proposes changing the configuration of virtualized resources (e.g., virtual machine (VM) or media) based on results of monitoring resource usage by an application. If the migration plan can decrease the cost of the application while maintaining the required service level of an application, the plan is provided to the application administrator. In certain embodiments, the management program can additionally increase the efficiency of the application by modifying a service catalog. According to some embodiments, the management program can apply the changed configuration of a migration plan to other virtual machines of the cloud computing environment, including those of other clients.

In an embodiment, a management server manages resources in a cloud system having one or more servers and one or more storage subsystems. The management server includes a processor; a network interface; and a memory. The management server is operable to: assign a category of resources to a first application of a first type, the category of resources being associated with a first template of virtualized resources, the first template being associated with one or more threshold values and having a first cost for using the first template, the one or more threshold values including a first threshold value; monitor performance of the first template to obtain one or more performance values for the first template, the one or more performance values obtained including a first performance value; compare the first performance value of the first template with the first threshold value associated with the first template; and generate a first resource migration plan for the first application of the first type based upon a result of the comparing step, the first resource migration plan being a plan to migrate the first application of the first type from the first template to a second template of virtualized resources. The second template is associated with a second threshold value that is greater than the first performance value. The second template has a second cost for using the second template that is less than the first cost.

In an embodiment, the first template is defined as a default template for a given function for the catalog. The management server is further operable to: implement the first resource migration plan, whereby the second template is associated with the first application of the first type in place of the first template; and define the second template as the default template for the given function for the catalog in place of the first template after implementing the first resource migration plan. The management server is further operable to assign the category to a second application of the first type, the category having the second template as the default template for the given function.

In an embodiment, the management is further operable to implement the first resource migration plan, whereby the second template is associated with the first application of the first type in place of the first template; obtain performance values of the second template that has been associated with the first application of the first type, the second template having a plurality of threshold values including the second threshold value; determine whether or not any of the performance values of the second template is exceeding the threshold values of the second template; and generate a second resource migration plan for a second application of the first type based upon a result of the determining step, the second resource migration plan being a plan to migrate the second application of the first type to the second template.

In another embodiment, a computer-implemented method for managing resources in a cloud system includes assigning a category of resources to a first application of a first type, the category of resources being associated with a first template of virtualized resources, the first template being associated with one or more threshold values and having a first cost for using the first template, the one or more threshold values including a first threshold value; monitoring performance of the first template to obtain one or more performance values for the first template, the one or more performance values obtained including a first performance value; comparing the first performance value of the first template with the first threshold value associated with the first template; and generating a first resource migration plan for the first application of the first type based upon a result of the comparing step, the first resource migration plan being a plan to migrate the first application of the first type from the first template to a second template of virtualized resources. The second template is associated with a second threshold value that is greater than the first performance value. The second template has a second cost for using the second template that is less than the first cost In yet another embodiment, a non-transitory computer readable medium includes a computer executable program for managing resources in a cloud system. The computer readable medium includes code for assigning a category of resources to a first application of a first type, the category of resources being associated with a first template of virtualized resources, the first template being associated with one or more threshold values and having a first cost for using the first template, the one or more threshold values including a first threshold value; code for monitoring performance of the first template to obtain one or more performance values for the first template, the one or more performance values obtained including a first performance value; code for comparing the first performance value of the first template with the first threshold value associated with the first template; and code for generating a first resource migration plan for the first application of the first type based upon a result of the comparing step, the first resource migration plan being a plan to migrate the first application of the first type from the first template to a second template of virtualized resources. The second template is associated with a second threshold value that is greater than the first performance value. The second template has a second cost for using the second template that is less than the first cost.

BRIEF DESCRIPTION OF THE DRAWINGS

FIG. 3 shows a physical storage table.
FIG. 4 shows a physical server table.
FIG. 6 shows a catalog table.
FIG. 7 shows a VM template table.
FIG. 8 shows a media template table.
FIG. 9 shows a provisioning GUI of a self-service portal.
FIG. 10 shows a confirmation GUI of a self-service portal.
FIG. 11 shows a mapping table.
FIGS. 13-A and 13-B show performance history tables.
FIG. 14 shows a mapping table.
FIG. 15 shows an event management table.
FIG. 16 shows a performance history table.

DESCRIPTION

Embodiments of the present invention relate to methods and systems that manage virtualized resources in cloud computing environments. In an implementation, a cloud system includes a management program that monitors IT resource usage of applications and determines if the applications are making efficient use of the allocated resources. If the management program determines that a given application is not utilizing the allocated resources efficiently, the management program provides a feedback to the application administrator based on the monitored results. The feedback includes a resource migration plan that is more cost effective than the current plan while maintaining the required service levels for the application. The resource migration plan may include changing the configuration of virtualized resources, e.g., virtual machine (VM) or storage media.

In certain embodiments, the management program can additionally increase the efficiency of the application by modifying a service catalog. According to some embodiments, the management program can apply the changed configuration of a migration plan to other virtual machines of the cloud computing environment, including those of other clients.

Providing Resource Migration Plan

Figure 1:
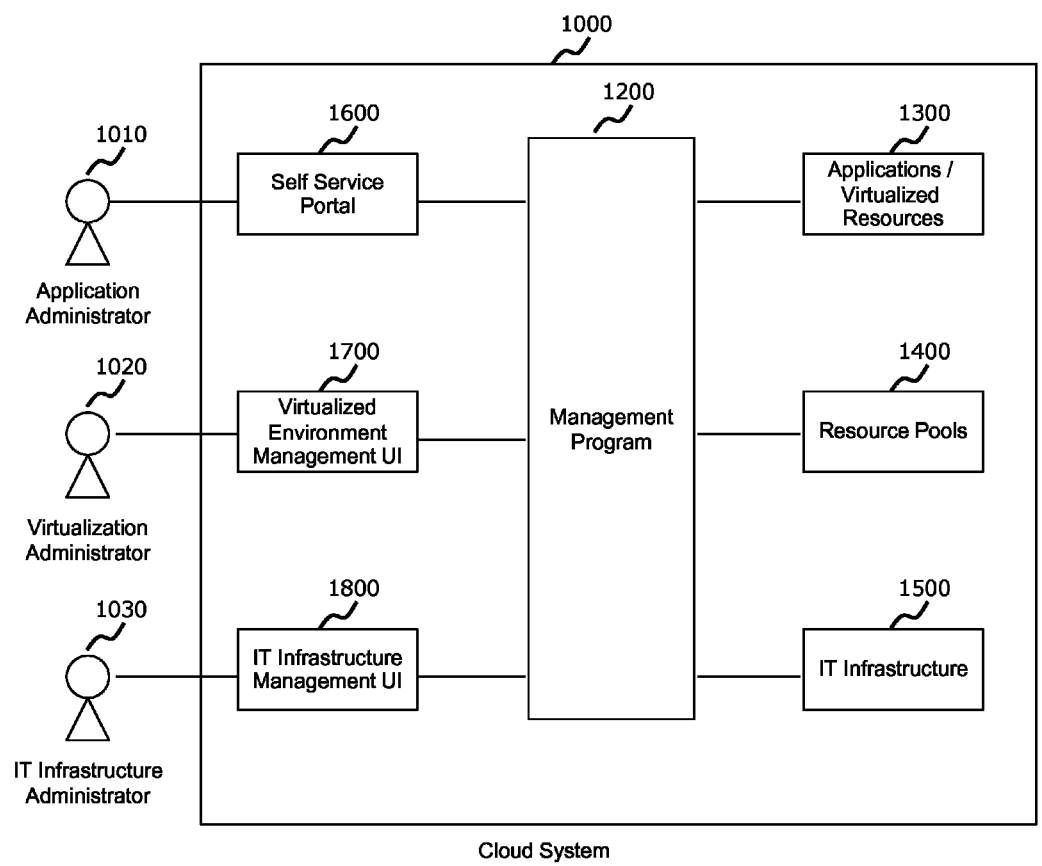
FIG. 1 shows a logical configuration of a cloud computing system according to a first embodiment.

FIG. 1 shows a logical configuration of a cloud computing system (also referred to as "cloud system" or "cloud environment") 1000 according to a first embodiment. Cloud systems utilize virtualization technology to provide hardware and software services over a network. The virtualization allows servers and storage devices to be shared with many different clients. Applications implemented on virtualized resources can be easily migrated from one physical machine to another.

Cloud system 1000 includes a management program 1200, applications and virtualized resources 1300, resource pools 1400, an IT infrastructure 1500, a self-service portal 1600, a virtualized environment management user interface 1700, and an IT infrastructure management user interface 1800.

In an implementation, management program 1200 provides the self-service portal 1600 and the user interfaces 1700 and 1800 for the administrators to use them to interface with cloud system 1000. An IT infrastructure administrator 1030 accesses cloud system 1000 via the IT infrastructure management user interface 1800 and manages the IT infrastructure 1500. IT infrastructure 1500 typically consists of physical resources (e.g., the physical servers and physical storage subsystems) that are provided resource pools 1400.

A virtualization administrator 1020 accesses cloud system 1000 via the virtualized environment management user interface 1700 and manages the resource pools 1400. Resource pools 1400 are created from IT infrastructure 1500 for use by the applications, such as mail servers or Web servers.

An application administrator 1010 accesses cloud system 1000 via the self-service portal 1600 to manage applications that are running (or executed) in cloud system 1000. Each application is executed on virtual resources. Applications executed on the cloud system 1000 (also referred to as "instance") use virtualized resources. The catalog may include one or more templates that, in turn, are made of a set of virtual resources that performs specific computing related functions. For example, a catalog may be configured to provide the service of online transaction processing (or "OLTP"), and the templates associated with that catalog are configured to provide the processing and storage functions needed for the OLTP service. In an implementation, application administrator provisions the virtualized resources for the applications using a catalog table for the resource pools 1400.

Figure 2A:
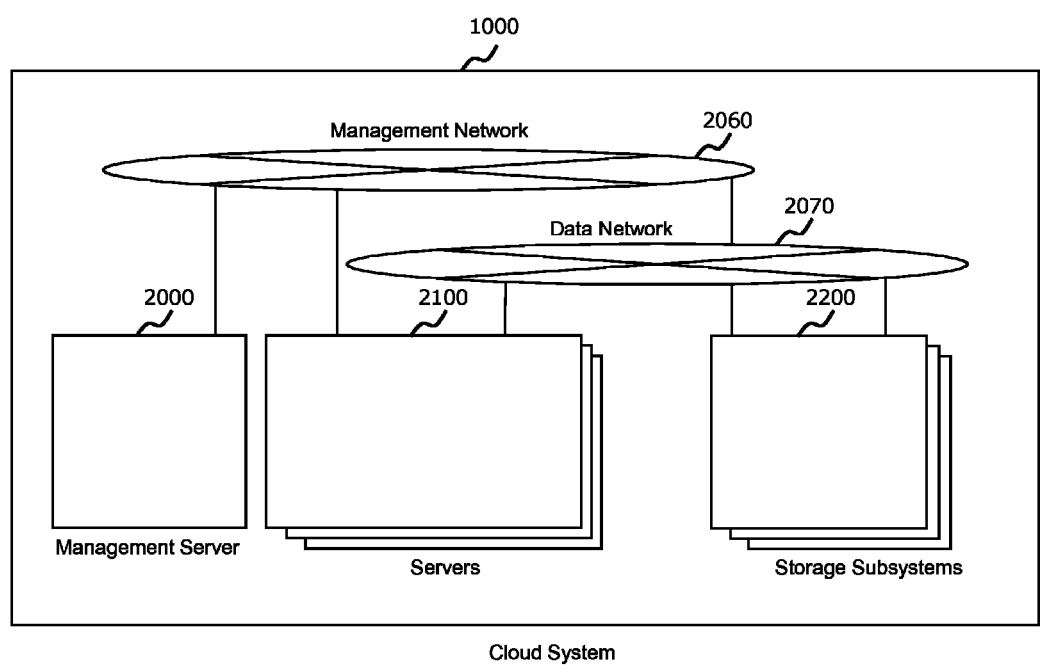
FIG. 2A shows a physical configuration of cloud system.

FIG. 2A shows a physical configuration of cloud system 1000. Cloud system 1000 comprises a management server 2000, one or more servers 2100, and one or more storage subsystems 2200. Servers 2100 and storage subsystems 2300 are connected via a data network 2070. Data network 2070 may be WAN (Wide Area Network), LAN (Local Area Network) or other suitable communication networks. Management server 2000, servers 2100, and storage subsystems 2200 are connected via a management network 2060. Management network 2060 may be a WAN, LAN, or other suitable communication network. Management server 2000, servers 2100, and storage subsystems 2200 are explained in more detailed in application Ser. No. 13/476,895, filed on May 21, 2012, entitled, "Method and Apparatus for Maintaining a Workload Service Level on a Converged Platform," which is incorporated by reference.

In an implementation, management network 2060 and data network 2070 are separate networks. Alternatively, they may be implemented in a single, common network or implemented to share one or more network elements. In an implementation, management server 2000 and servers 2100 are separate physical machines, but any server can host a management server, for example. For example, server 2100 and storage subsystem 2200 may be implemented in a single, integrated system.

Figure 2B:
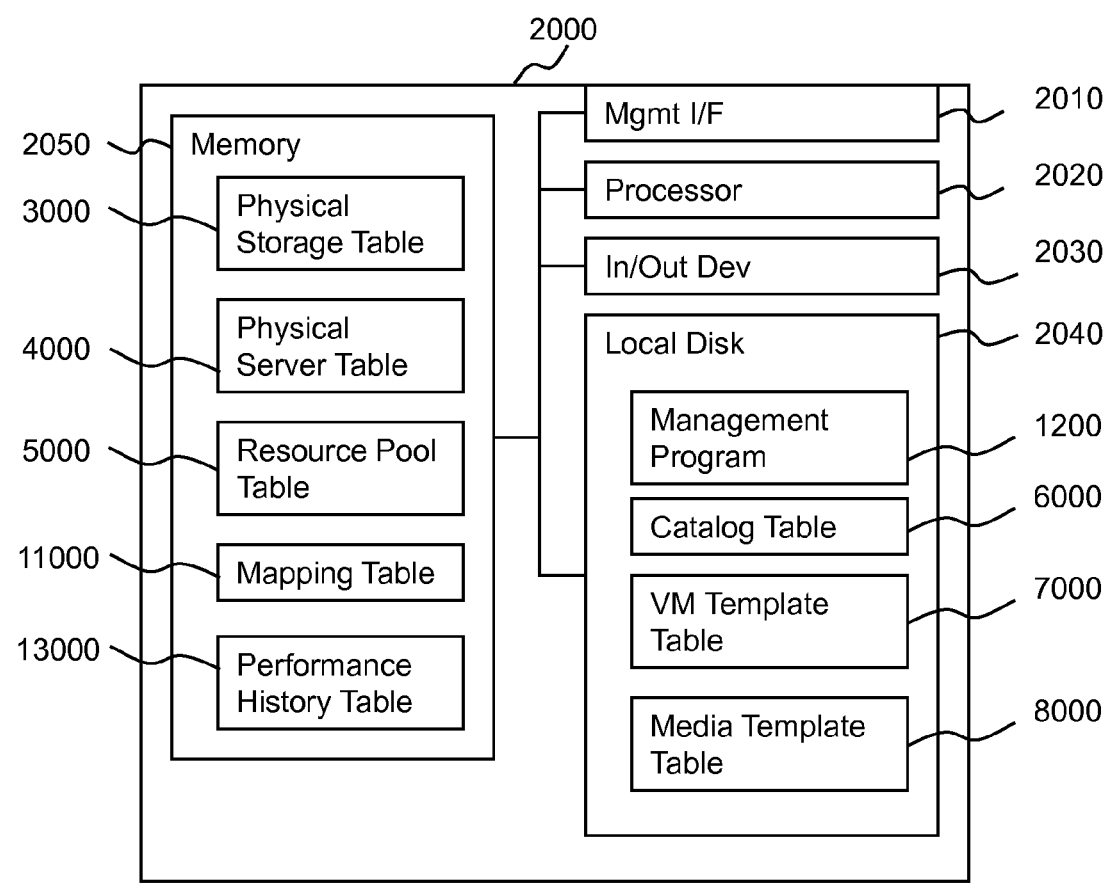
FIG. 2B shows a more detailed view of management server of cloud system.

FIG. 2B shows a more detailed view of management server 2000 of cloud system 1000. A management interface 2010 is an interface to management network 2060. A processor 2020, e.g., a central processing unit, is configured to execute operations for the management server. Input and output device 2030 is a user interface such as monitor, keyboard and mouse.

A non-volatile storage media or local disk 2040 stores information for use by management server 2000 and may include a plurality of hard disks. Local disk 2040 includes management program 1200, a catalog table 6000, a VM template table 7000, and a media template table 8000. In an implementation, any non-volatile, non-transitory computer readable storage medium may be used in place of local disk 2040 including solid state drive (SSD). Alternatively, a combination of the storage media can be used.

Management program 1200 comprises computer readable code or instructions. Typically these instructions are loaded to a memory and executed by processor 2020 in order to perform specific operations. Management program 1200 uses data stored in catalog table 6000, VM template table 7000, and media template table 8000 to perform these operations. Details regarding the procedure of the management program 1200 are summarized in connection with FIG. 2C. Depending on implementation, management program 1200 or any of the above tables may be provided in a location separate from management server 2000.

A memory 2050 is dynamic random access memory (DRAM) in an implementation, but may be other suitable storage devices. Memory 2050 includes a physical storage table 3000, a physical server table 4000, a resource pool table 5000, a mapping table 11000, and a performance history table 13000. Each of these tables is described in more detail below.

Figure 2C:
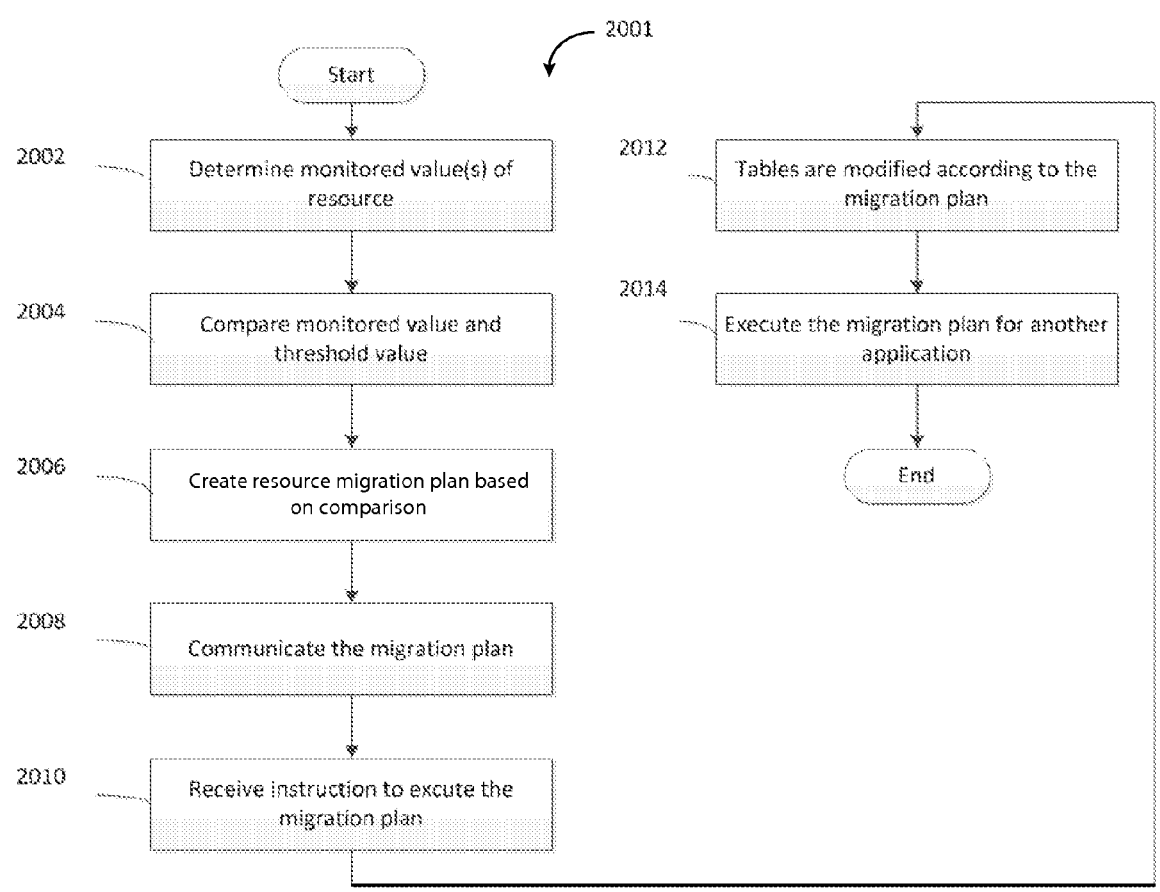
FIG. 2C illustrates a process.

FIG. 2C illustrates a process 2001. At step 2002, management program 1200 instructs a processor to determine a monitored value of an allocated virtualized resource allocated to an application operating in a cloud computing system. The application is implemented in the cloud system based on a specified service level. Management program 1200 instructs the processor to compare the monitored value and a threshold value (step 2004). Based on the comparison, management program 1200 instructs the processor to create a resource migration plan that is more cost effective than the current plan for the application (step 2006). The migration plan is effective if it satisfies the specified service level defined for the application and costs less to executing it than the existing plan. Management program instructs the processor to communicate the migration plan to the application administrator (step 2008). Management program 1200 instructs the processor to execute the migration plan upon receiving a command from the application administrator to execute the migration plan (step 2010). A service catalog table and other related tables are modified according to the migration plan authorized by the application administrator (step 2012). Additionally, management program 1200 may further instruct the processor to receive a command from an administrator (the same or different administrator) at a later time to execute the migration plan on another application also operating within the cloud system (step 2014). More details regarding the process for generating the migration plan by the management program 1200 are described later in connection with FIG. 12.

FIG. 3 shows a physical storage table 3000. Physical storage table 3000 represents part of IT infrastructure 1500 managed by IT infrastructure administrator 1030. A column 3010 shows the identification of storage subsystem 2200. A column 3020 shows the physical volumes of the storage subsystem.

Each storage subsystem includes multiple physical volumes such as RAID groups. A RAID group may have a plurality of attributes (e.g. tier and capacity). For example, the tier of the RG-011 is SAS, and the capacity of the RG-011 is 10 (or 10 TB). In an implementation, physical volume may be a RAID group. However, this is not required and in alternative implementations physical volume can be a HDD, for example.

Each row shows the storage subsystem. For example, a row 3100 shows the physical configuration of the storage subsystem SUB-01. This subsystem includes five physical volumes: RG-011, RG-012, RG-060, RG-062, and RG-063.

IT infrastructure administrator 1030 updates the physical storage table 3000 when storage resources are added, deleted, or modified. The trigger for adding, deleting or modifying the storage resources may be a request from the virtualization administrator 1020. Alternatively, the IT infrastructure administrator 1030 may add, delete, or modify the table at his own initiative, or based on a request from another administrator.

FIG. 4 shows a physical server table 4000. Physical sever table 4000 represents part of IT infrastructure 1500 managed by IT infrastructure administrator 1030. A column 4010 shows the identification of the server 2100. A column 4020 shows number of cores and type of the CPU. A column 4030 shows numbers of GPUs. A column 4040 shows amount of memory.

Each row shows the server. For example row 4100 shows the physical configuration of the server SVR-01 having "high" type, 48 core CPUs and 128 GB memory. However, this server does not have any GPU.

IT infrastructure administrator 1030 updates the physical server table 4000 when the server resources are added, deleted, or modified. The trigger for adding, deleting or modifying the server resources may be based on a request from virtualization administrator 1020. Alternatively, the IT infrastructure administrator 1030 may add, delete, or modify the table at his own initiative, or based on a request from another administrator.

Figure 5:
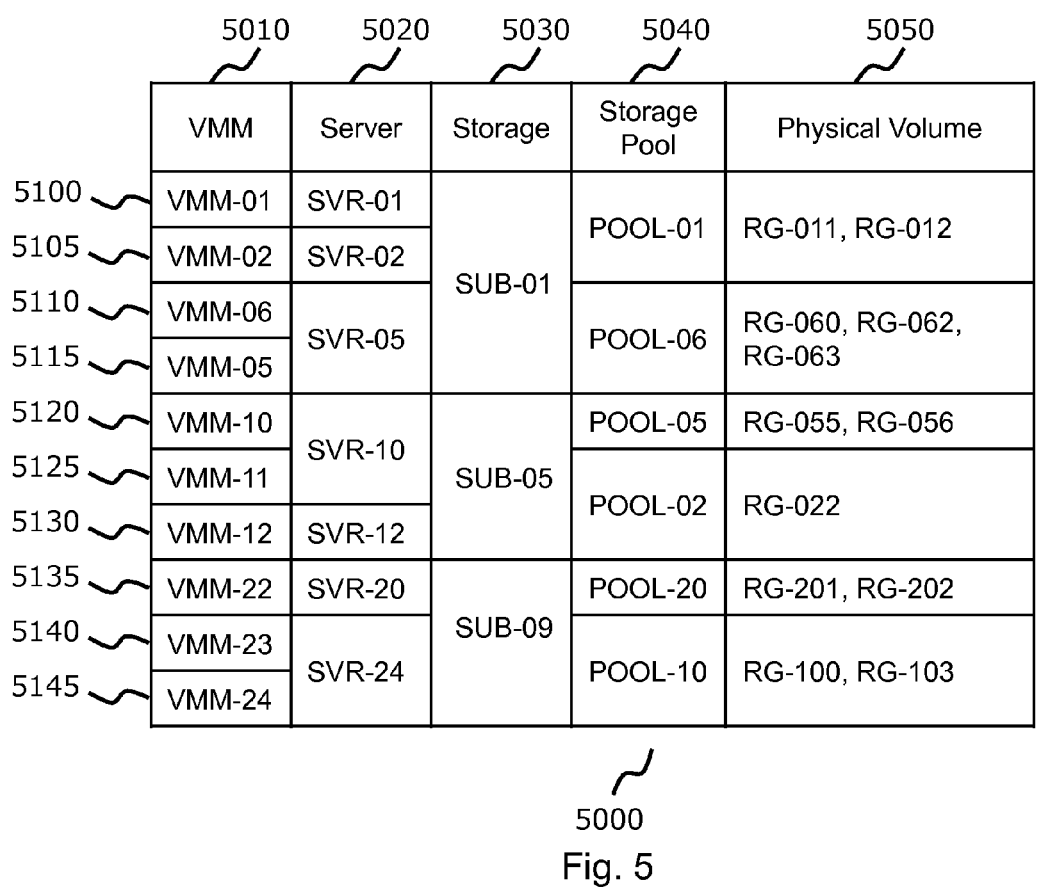
FIG. 5 shows a resource pool table.

FIG. 5 shows a resource pool table 5000. Resource pool table 5000 represents part of resource pools 1400 managed by virtualization administrator 1020. A column 5010 shows the identification of the virtual machine manager (VMM). VMM is used to manage virtual machines which are a software implementation of a machine, e.g., a server or storage. A column 5020 shows the identification of the server 2100. A column 5030 shows the identification of the storage subsystem 2200. A column 5040 shows the identification of the storage pool. A column 5050 shows the physical volume.

Each row shows the configuration of a resource pool. The resource pool includes a VMM and a subset of the storage pool. The VMM uses a server resource. For example, the VMM-01 5100 uses the server resource of SVR-01. A plurality of VMMs may be implemented by using a single server. For example, VMM-05 and VMM-06 are implemented using the server resource of SVR-05.

The storage pool is implemented using one or more physical volumes of storage subsystems. For example, POOL-01 comprises physical volumes RG-011 and RG-012 of the storage subsystem SUB-01.

In an implementation, resource pool table 5000 is managed primarily by virtualization administrator 1020. For example, virtualization administrator 1020 performs the following steps to add a new storage subsystem to a resource pool.
1. IT infrastructure administrator 1030 creates physical volumes in advance.
2. Virtualization administrator 1020 defines the mapping between server 5020 and storage pool 5040. In this example, a relation between server and storage pool is N:1, but this is not required.
3. Virtualization administrator 1020 creates the storage pool 5040 from multiple physical volumes 5050.

Virtual administrator 1020 performs the following steps to add a new server to a resource pool.
1. Virtualization administrator 1020 defines the mapping between server 5020 and storage pool 5040. In this example, a relation between server and storage pool may be N:1, but this is not required.
2. Virtualization administrator 1020 creates the VMM 5010 on the server 5020. In this example, a relation between VMM and server may be N:1, but this is not required.

In an implementation, virtualization administrator 1020 manages resource pool table 5000 according to the monitoring result of the resource pool 1400. However, virtualization administrator 1020 may modify the resource pool 1400 based on a request from application administrator 1010.

FIG. 6 shows a catalog table 6000. Application administrator accesses catalog table 6000 using the self-service portal 1600 in order to provision cloud resources for applications. An application is implemented in the cloud by using one or more catalogs. The catalog refers to a set of templates in the present implementation. The template refers to a set of virtualized resources that performs certain computing related functions, e.g., processing or storage. Each template has a plurality of attributes associated thereto. Catalog table 6000 may be stored in a non-volatile storage device (e.g., local disk 2040) and loaded onto memory 2050 of the management server 2000 so that it may be accessed quickly by processor 2020.

A column 6005 shows the identification of each template. A column 6010 shows the name of the template. Columns 6020, 6030, 6040, and 6050 specify the required resource attributes for each template. Each template is defined with specific cloud resource requirements or attributes. Column 6020 shows the type of the virtual machine (VM) required for a template. Column 6030 shows the number of VMs for a template. Column 6040 shows the type of the storage media for a template. Column 6050 shows the capacity of the storage media for a template.

Catalog table 6000 also includes a plurality of performance items to monitor during operation to ensure that the catalog(s) provisioned for an application will be able to provide the service levels required for the application. Columns 6060, 6070, 6080, 6090, and 6100 list the monitoring items (or threshold values) for each catalog. Column 6060 shows a threshold value of the CPU usage. Column 6070 shows a threshold value of the memory usage. Column 6080 shows a threshold value of the disk usage. Column 6090 shows a threshold value of the latency. Column 6100 shows a threshold value of the I/O per second (IOPS).

In an implementation, each row of catalog table 6000 defines a service level agreement for a catalog. The service level agreement (SLA) includes specific cloud resource requirements and is satisfied by assigning a catalog that is associated with templates having certain attributes according to the present implementation. The performance monitoring items 6060-6100 are monitored to determine if the templates of a catalog are performing within acceptable ranges so that the service level agreement could be maintained. The requirements for a service level agreement vary according to implementation.

In the present implementation, catalog table 6000 defines the service level agreement by specifying: (1) templates or attributes of cloud resources, and (2) the performance monitoring items. The attributes of cloud resources include VM type, number of VMs, media type, media capacity. The performance monitoring items include CPU usage threshold, memory usage threshold, disk usage threshold, latency threshold, and IOPS.

For example, row 6240 shows a catalog defined for a Web application. This catalog has three types of VMs: two VMs of normal VM 6242, a high memory VM 6244, and a high CPU VM 6246, and four VMs in total. "Normal" VMs 6242 are required to have 2 TB of "Normal" media, and monitored to see if their disk usage reaches 80% of the allocated disk capacity. For "High CPU" VM 6246, it is monitored to see if its CPU usage reaches 85% and disk usage reaches 75% of the allocated resources.

FIG. 7 shows a VM template table 7000. VM template 7000 describes the resource configuration of each VM type 6020 in catalog table 6000. VM table 7000 may be stored in a non-volatile storage device and loaded onto memory 2050 of the management server 2000 so that it may be accessed quickly by processor 2020.

Each row describes a resource type having certain attributes. A row 7110 lists the VM type 6020. A row 7115 lists the identification of VM type. A row 7120 lists the processor type, e.g., normal, high, and GPU. If the GPU is selected, GPU is used instead of CPU. A row 7130 lists the processor performance. This value is a relative value with respect to normal CPU. A row 7140 lists the number of processors. A row 7150 lists the capacity of the memory. A row 7160 lists the maximum IOPS. A row 7170 lists the unit price. The unit price gives the costs of using a particular VM type 6020. For example, normal VM type 7010 costs 10 units, high memory VM type 7020 costs 30 units, high CPU VM type 7030 costs 80 units, and high I/O VM type 7040 costs 90 units. The unit may be dollars per month or any other suitable mechanism representing the cost of using the virtualized resource.

Each column describes the resource configuration of each VM type having certain attributes. For example, column 7010 shows the configuration of the normal VM. The normal VM comprises one normal processor and 4 GB memory, and can handle up to 50,000 IOPS. The unit price is 10. As used herein, term "attribute" refers to any performance characteristics of physical or virtualized resources.

FIG. 8 shows a media template table 8000. Media template table 8000 describes the resource configuration of each media type 6040 in the catalog table 6000. Media template table 8000 may be stored in a non-volatile storage device and loaded onto memory 2050 of the management server 2000 so that it may be accessed quickly by processor 2020.

Each row describes certain characteristics or attributes of the media. A row 8110 lists the media type 6040. A row 8115 lists the identification of the media type. A row 8120 lists the media technology, e.g., SATA, SAS, and the like. A row 8130 lists the IOPS per unit capacity. A row 8140 lists the unit price.

Each column describes the resource configuration for each media type having certain attributes. A column 8010 shows a configuration for the "normal" media type. A column 8020 shows a configuration for the "mid" media type. A column 8030 shows the configuration for the "high" media type. A column 8040 shows a configuration for the "extra" media type. For example, the high media type 8030 comprises media that is 20% SSD and 80% SAS HDD, and the TOPS per unit capacity is 28,000, and the unit price of for the media is 20.

FIG. 9 shows a provisioning GUI 1600-A of the self-service portal 1600. Provisioning GUI 1600-A is provided to application administrator 1010 by management program 1200. Application administrator 1010 uses GUI 1600-A to provision cloud resources for an application for executing on the cloud. For example, application administrator 1010 selects an application type 9010, e.g., "Mail-500box." Application types available for application administrator 1010 are displayed in a drop-down menu. In an implementation, these application types correspond to catalog names 6010 of catalog table 6000. The application "Mail-500box" being created corresponds to the catalog "Mail-500box" 6250 in the catalog table 6000.

Application administrator 1010 inputs the name of the application, e.g., "Mail-A", in an application name section 9020, and selects the size of the application using an application size section 9030. For example, if a unit of the "Mail" application is 500 boxes, application administrator 1010 can select a multiple of 500 using application size section 9030.

In an implementation, application administrator 1010 may input the time period (e.g., 2 years) for the application being created using a time period section 9040. Units of the period may be hours, days, month, and year, but is not limited to these. The time period may or may not need to be inputted depending on implementation. If a confirm button 9110 is pressed, management program 1200 displays a confirmation GUI. If a cancel button 9120 is pressed, the resource provisioning process is aborted.

FIG. 10 shows a confirmation GUI 1600-B of the self-service portal 1600. GUI 1600-B is displayed if application administrator 1010 presses the confirm button 9110 of the provisioning GUI 1600-A. A field 10010 shows the application type. A field 10020 shows the application name. A field 10030 shows the size of the application. A field 10040 shows the time period for the application.

A field 10200 shows the information of VMs or virtualized resources that have been provisioned for the application "Mail-A." A column 10250 shows the names of the VMs. In an implementation, the names 10250 are created by the management program 1200 based on the name in application name field 10020. The application "Mail-A" has four VMs (see catalog 6250 in FIG. 6) and management program 1200 names these four VMs as Mail-A-1, Mail-A-2, Mail-A-3, and Mail-A-4. A column 10260 shows the number and type of the CPU. A column 10270 shows the capacity of the memory. A column 10280 shows the capacity and the type of the media.

Each row shows the configuration of each VM for "Mail-A." For example, a row 10210 shows the configuration specified for the Mail-A-1, which is specified to have 16 of High CPU, 8 GB memory, and 2 TB of SSD and SAS media.

A field 10050 shows the calculated unit cost of the application "Mail-A" based on the virtualized resources provisioned as shown in GUI 1600-B. The application "Mail-A" having four VMs of "High I/O" and 8 TB of "Mid" storage media. Assuming the unit cost of each "High I/O" VM is 90 and the unit cost of 8 TB of "Mid" media is 40, the total cost for the application "Mail-A" would be 400 units.

A cancel button 10120 causes the management program 1200 to cancel the provisioning process. A back button 10130 causes the management program 1200 to redisplay the provisioning GUI 1600-A.

A confirm button 10110 causes the management program 1200 to execute the following steps:
1. Determine whether or not the existing resource pools is available to host the requested resources by checking a mapping table (see FIG. 11 below), physical storage table 3000, physical server table 4000, and resource pool table 5000.
2. Provision the requested resources as VMs from the resource pools if the availability exists. The resources are provisioned on a selected VMM. A new column is added to the mapping table 11000 (described below).
3. If the availability does not exist, notify the application administrator 1010 by sending an error message.

FIG. 11 shows a mapping table 11000. Mapping table 11000 associates each application to the sets of virtualized resources (e.g., VM templates and storage medium templates) that have been provisioned to implement the applications in the cloud. Mapping table 11000 is loaded in the memory 2050 of the management server 2000 in an implementation.

A column 11010 shows the identification of the application. A column 11020 shows the application name which corresponds to the name input in the application name field 9020 of the GUI 1600-A by the application administrator 1010. A column 11030 shows the identification of the catalog. This identification is obtained by matching the application type and the catalog ID 6005 in catalog table 6000. The application type is selected using the application type field 9010 of the GUI 1600-A by application administrator 1010. For example, the application type for the application "Mail-A" is "Mail-500box" 6250 which is given the catalog ID "5." See FIG. 6.

A column 11040 shows the names of the VMs for the application. In an implementation, the names of the VMs may be created automatically by management program 1200 using the application name, but the application administrator may be allowed to specify the name for each VM.

A column 11050 shows the identification of the VM. In an implementation, this identification may be created by management program 1200 when the VM is created. A column 11060 shows the identification of the VMM. A column 11070 shows the virtual volume name. These virtual volumes may be created from storage pool 11100. A column 11080 shows the media type ID of the virtual volume. A column 11090 shows the capacity of the virtual volume. A column 11100 shows the identification of the storage pool.

Each of rows 11110, 11120, 11130, 11140, 11150, 11160, and 11170 shows the configuration of a corresponding application. An application may be executed on more than one VM and use more than one virtual volume. For example, application "Web-C" may be executed on four VMs: WebDB, WebLogic, WebFont-1, and WebFront-2. The VM "WebDB" may be executed on the VMM-02 and use 5 TB of virtual volume VOL-052 and 5 TB of virtual volume VOL-055. These virtual volumes may be created from the same storage pool, e.g., storage pool POOL-01.

Figure 12:
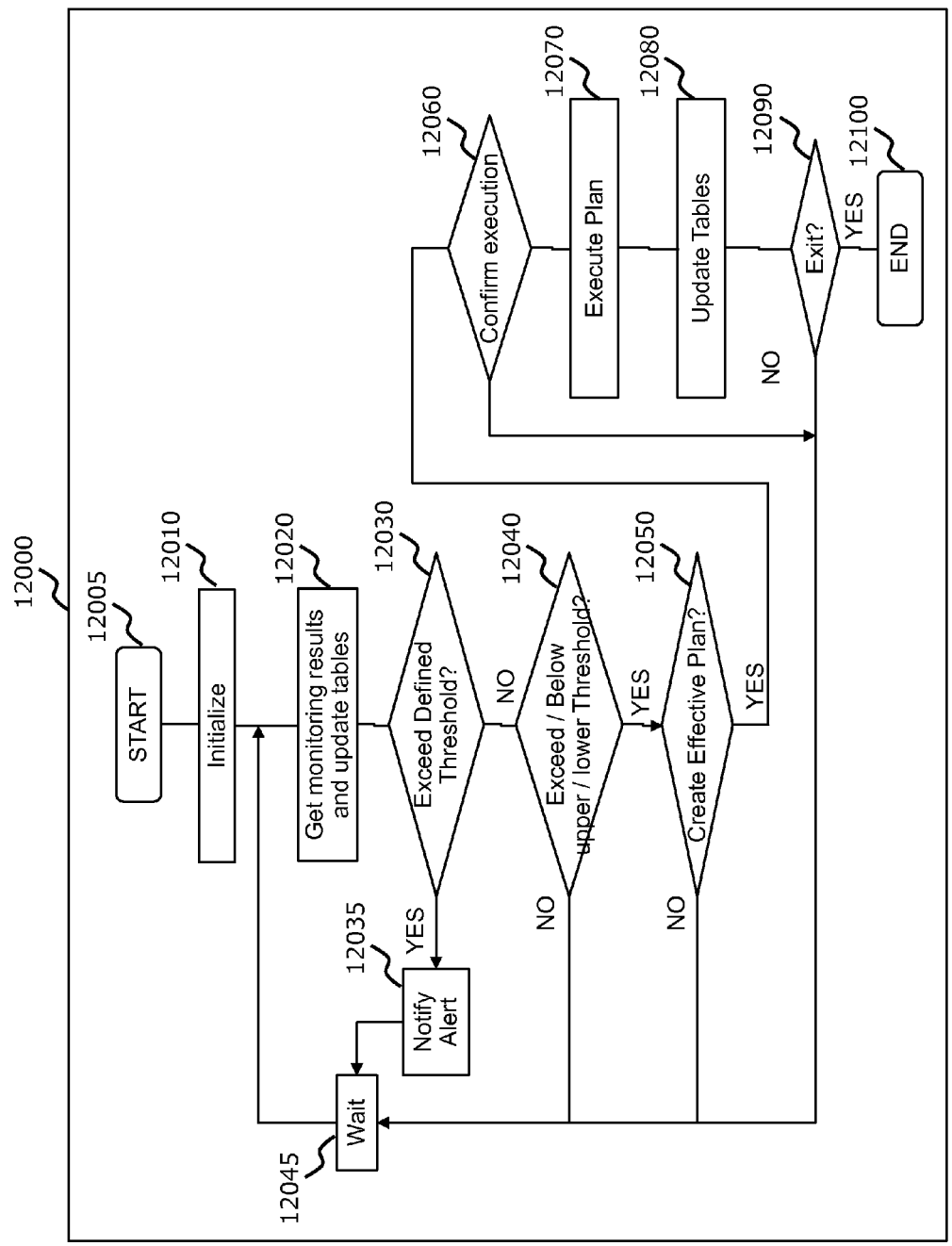
FIG. 12 shows a process performed by a management program for decreasing the cost of executing an application in a cloud system.

FIG. 12 shows a process 12000 performed by management program 1200 for decreasing the cost of executing an application in a cloud system. At step 12005, the process 12000 starts. At step 12010, management program 1200 creates or loads the physical storage table 3000, the physical server table 4000, the resource pool table 5000, the mapping table 11000, and the performance history table 13000 in memory 2050.

Then, the management program 1200 loads catalog table 6000, the VM template table 7000, and the media template table 8000 from the local disk 2040 to the memory 2050 in the management server 2000.

The upper limit threshold and the lower limit threshold are set. For example, upper limit threshold is set to 70% and lower limit threshold is set to 30%. Of course, the specific values are not limited to these. The values are stored in the memory 2050 in the management server 2000.

At step 12020, the resource usage of applications are monitored and retrieved, and performance history table 13000 is updated.

At step 12030, it is determined whether or not the value obtained from the monitoring (or "monitored value") exceeds a threshold value that is set when the application is deployed. If the monitored value exceeds the threshold value, the process proceeds to step 12035. At step 12035, the alert is sent to the application administrator. The process goes to step 12045. Additional resources would need to be provisioned for the application so that the monitored value would not exceed the threshold value. After waiting a given time, the process is returned to step 12020 (step 12045).

At step 12040, a determination is made whether or not the monitored value exceeds the upper limit threshold or is below the lower limit threshold. If so, the process goes to step 12045. Otherwise, the process goes to step 12050.

At step 12050, a determination is made whether or not a resource migration plan that is more cost effective than the current plan can be created. In an implementation, the resource migration plan is created if at least one of the following conditions is met:
  a. CPU usage is greater than the upper limit threshold and the memory usage is less than the lower limit threshold.
  b. CPU usage is less than the lower limit threshold and the memory usage is greater than the upper limit threshold.
  c. CPU usage and memory usage are both less than the lower limit threshold;
  d. IOPS is less than the lower limit threshold.

If a resource migration plan is created, the process goes to step 12060. Otherwise, the process goes to step 12045. A plan is more cost effective than another if all the monitoring values do not exceed the threshold values and the total cost of implementing the application is decreased. Some examples are provided below in FIGS. 13-A and 13-B.

At step 12060, a determination is made whether or not the resource migration plan is to be executed. In an implementation, the resource migration plan is provided to the application administrator. The application administrator can select to have the plan be executed immediately or schedule for a later time. If the scheduled execution time is specified, the plan is registered to the scheduler for a subsequent execution.

At step 12070, the resource migration plan is executed. At step 12080, the mapping configurations are changed and the mapping table 11000 is updated according to the resource migration.

At step 12090, the process checks whether or not the termination indication by a user exists. If it does, the process goes to step 12100 and stops. Otherwise the procedure goes to step 12045 to continue the process.

FIGS. 13-A and 13-B show performance history tables 13000-A and 13000-B. These tables are used to describe a process for creating a resource migration plan. A column 13010 shows the name of the VM. A column 13020 shows the identification of each entry, but is not limited to this. For example, this can be a time stamp of each record. A column 13030 shows the CPU usage. This VM may use 16 VMs, therefore there are 16 columns. A column 13040 shows the memory usage. A column 13050 shows the disk usage. A column 13060 shows the latency. A column 13070 shows the IOPS. In an implementation, a new row is added each time management program 1200 receives the monitoring results in step 12020 in process 12000. When the new row is added, the oldest entry can be deleted to save the memory space.

In FIG. 13-A, performance history table 13000-A provides information on the VM "Mail-A-2." It describes how a management server creates a plan. Table 13000-A has three rows 13110, 13120, and 13130 of information obtained from three monitoring attempts. In an implementation, CPU usage and memory usage are calculated by using the latest monitoring results, i.e., using the row 13130. Alternatively, the management program 1200 can utilize historical information, e.g., the last three historical pieces of information or rows 13110, 13120, and 13130.

In this example, the latest monitoring results or the row 13130 is used. The average of CPU usage is 18%, the memory usage is 97%, and TOPS is 41,000. The average CPU usage is an average usage of the 16 CPU cores used for the VM "Mail-A-2." This case corresponds to the condition (b) of the step 12050 above. Therefore management program 1200 creates a resource migration plan for application administrator 1010 to consider.

VM type ID of the Mail-A-2 is "4" based on the mapping table 11000. VM type "4" requires "High I/O" based on the VM table 7000. For VM type "4," the processor type is defined to be "High," the processor performance is defined to be "10," and the number of processors is defined to be "16." Accordingly, the total processor performance of the VM type 4 or "Mail-A-2" is 160. Since the CPU usage of VM "Mail-A-2" is 18%, the used processor performance is 28.8 or (160*0.18).

In this example, the management server may create a plan to migrate the VM Mail-A-2" from "High I/O" to "High Memory." VM template table 7000 indicates that processor performance of "High Memory" VM is 10 and number of processors is 8. Therefore processor performance of "High Memory" VM is 80. Since the monitored value for the processor performance of the "Mail-A-2" VM is 28.8, the expected CPU usage of the "Mail-A-2" VM when it is migrated to "High Memory" VM is 36% (or 28.8/80*100), which is below the upper limit threshold (or the monitored item for CPU usage).

Similarly, management program 1200 can calculate the memory usage if the resource migration is implemented. The performance history indicates that 97% of 8 GB memory is being used (or 7.76 GB) in the VM "High I/O." Memory size of the "High Memory" VM is 32 GB. Therefore, the expected memory usage of the "Mail-A-2" VM on "High Memory" VM is 24.25% (or 7.76/32*100), which is below the upper limit threshold.

Maximum IOPS of "High Memory" VM is 100,000 so IOPS usage would be 41% (or 41000/100000*100) if the resource migration is implement. This IOPS usage would be below the upper limit threshold. Finally, unit price of the "High I/O" VM is 90 and "High Memory" VM is 30. "Mail-A-2" VM uses 8 TB of "Mid" media so storage cost is 40. Thus, the current total cost (server cost+storage cost) is 130, and the expected cost after migration is 70, which is 46.2% lower than the current total cost.

Accordingly, management program 1200 provides the following plan to the application administrator:

Plan: Migrate VM type of the VM "Mail-A-2" from "High I/O" to "High Memory";

Impact: Lower cost by 46.2%.

FIG. 13-B shows a performance history table 13000-B of "OLTP-B-2". The table is used to describe how the management server generates a resource migration plan. For historical information 13230, the average of CPU usage is 52%, memory usage is 51%, and IOPS is 34,000. Referring to mapping table 11000, the virtual volumes of "OLTP-B-2" is 5 TB and identification of media type ID is 3. Media template table 8000 shows that type 3 is "High" media and has and IOPS/unit capacity of 28,000. The total IOPS of these five virtual volumes is 140,000 (or 5*28,000). Since the current TOPS is 34,000, 24.3% (or 34,000/140,000*100) of the media performance is used. This case corresponds to the condition (d) of the step 12050. Therefore management program 1200 creates a resource migration plan for "OLTP-B-2."

For example, the management server may create a plan to migrate 'Mid' media. Referring media template table 8000, this IOPS/unit capacity is 10,000 so the total IOPS of 5 TB virtual volume may be 50,000 (10,000*5). Since the current IOPS is 34,000, 68.0% (or 34,000/50,000*100) of the media performance would be used. This is below the upper limit threshold. Unit price of the 'High' media is 20 and that of 'Mid' media is 5. "OLTP-B-2" uses 5 TB of media so the storage cost is 100 and 25, respectively.

On the other hand, server cost of "OLTP-B-2" is 80. Therefore, the current total cost (server cost+storage cost) is 200, and the expected cost after migration is 105, which is 41.7% lower than the current total cost. Accordingly, management program 1200 provides the following plan to the application administrator:

Plan: Migrate media type of the "OLTP-B-2" from "High" to "Mid"

Impact: Cost will be lowered by 41.7%

In an implementation, management program 1200 monitors status and performance of the application. The management program creates an alternative plan which changes the configuration of the VM or media base on the monitored result, e.g., entries in the performance history table 13000-A or 13000-B. If the resource migration plan created can decrease the cost of the application while maintaining the service level requirements of the application, the management program provides this plan to the application administrator. By using the created migration plan, the application administrator can decrease the IT resource usage cost, e.g., the cost for executing the application.

Modifying Catalog Table

According to a second embodiment, the management program may select a VM template or media template and update the relevant tables when the management program 1200 implements a resource migration plan. The second embodiment relates to modifying the catalog table to increase the efficiency of applications being executed in the cloud system. Some of the steps used for the process of this embodiment are similar to those disclosed above. Accordingly, selected steps that are different from those disclosed above are described below.

FIG. 14 shows a mapping table 14000. Configuration of mapping table 14000 is similar to mapping table 11000 above. A plurality of applications (e.g., OLTP-G, OLTP-H, OLTP-J, OLTP-L, OLTP-M, OLTP-N, and OLTP-K) is deployed. According to the second embodiment, a process performed by management program 1200 for decreasing the cost of executing an application in a cloud system is similar to the process 12000 above. Some of the differences include the following sub-steps that are added to step 12040 in the process 12000:

1. The applications having the same catalog ID are selected, e.g., applications which having catalog ID "2." There are seven applications having catalog ID "2" in the mapping table 14000.
2. It is checked whether or not VM type or media type are changed by migration. The application type which has catalog ID "2" is "OLTP Mid" application. See table 6000. This application type uses "High CPU" VM (or VM type ID=3, see table 7000) and "High" media (or Media type ID=3, see table 8000) as a default. However, the VM type of all the VMs in the mapping table 14000 are "High Memory" having VM type ID "2."
3. "OLTP Mid" application is deployed on the "High CPU" VM as a default. However, all the "OLTP Mid" applications are migrated to "High Memory" VMs. Therefore, the management program 12000 determines that the "OLTP Mid" application should be deployed on "High Memory" VM as a default.
4. VM type of the "OLTP Mid" row 6220 in the catalog table 6000 is replaced from "High CPU" to "High Memory." After that, "High Memory" VM is used as a default for the "OLTP Mid" application.

In an implementation, the condition to replace the template may be that all the applications are migrated. However, the second embodiment is not limited to this.

Management program 1200 may define a given template as the default template for an application type according to a threshold value, e.g., 80%. For example, if more than 80% of the applications of a given type is migrated using the given template, the default template of that application type is changed to that template.

Alternatively, the management program 1200 may define a given template as the default template for an application type by using a number of applications that has been migrated to that template. For example, if more than 10 applications of the same type have been migrated to a given template, that template may be defined as the default template for that application type.

Applying Migration Plan to Other Virtual Machines

According to a third embodiment, a process provides a best practice feedback for other applications rather than focusing on decreasing the cost of executing a particular application. The third embodiment relates to applying a migration plan created for a particular application to other VMs including other those of other clients. Some of the steps used for the process of this embodiment are similar to that disclosed above. Accordingly, selected steps that are different from those disclosed above are described below.

FIG. 15 shows an event management table 15000. Event management table 15000 may be created in memory 2050 of management server 2000 by the management program 1200 when the management program 1200 is loaded from local disk 2040 to memory 2050.

A column 15010 shows the time that an event had occurred. A column 15020 shows the VM name that is the target of the event. A column 15030 shows the event type. Event type may be either VM migration or media migration. A column 15040 shows the identification of the original state. A column 15050 shows the destination of the migration. For columns 15040 and 15050, the identification is the "VM Type ID" or the "Media Type ID" depending on the migration event.

Each row shows an event. For example, a row 15210 shows that VM type of the OLAP-E-1 is migrated from "High Memory" to "High CPU" at time 15.

FIG. 16 shows a performance history table 16000. Performance history table 16000 is similar to the performance history table 13000-A or 13000-B above. One of the differences is the addition of a column 16070 that provides the cost to execute the VM. Table 16000 shows the performance history of the VM Mail-A-2. The cost to execute this VM is 130 at time 131.

A process performed by management program 1200 according to the third embodiment for decreasing the cost of executing an application in a cloud system is similar to the process 12000 above. Some of the differences include the following sub-steps that are added to step 12040 in the process 12000:

1. Management program 1200 refers to event management table 15000 at time 133. Management program 1200 confirms that VM type of the Mail-A-2 was changed at time 132.
2. Management program 1200 refers to performance history table 16000. Management program 1200 confirms that cost of the VM Mail-A-2 is decreased by 46.2% and all metrics are below the upper limit threshold at time 133.
3. Management program 1200 determines the migration was an efficient migration.
4. Management program 1200 attempts to apply this migration to the same type of VMs.
5. Management program 1200 determines that catalog ID of the Mail-A-2 is 5 by referring catalog table 6000. By referring mapping table 11000, other VMs with catalog ID is "5" are determined to be: Mail-A-1, Mail-A-2, Mail-A-3, and Mail-A-4.
6. Management program 1200 selects as target VMs: Mail-A-1, Mail-A-2, Mail-A-3, and Mail-A-4. For each, if VM type is "High CPU," management program 1200 creates a plan to migrate the VM to "High Memory" and simulates a performance. If all the metrics are below the upper limit threshold, this plan is provided to the application administrator In an implementation, management program 1200 uses a single piece of historical information. However, the embodiment is not limited to this. For example, management program 1200 can use multiple pieces of historical information.

The preceding has been a description of the preferred embodiments of the invention. It will be appreciated that deviations and modifications can be made without departing from the scope of the invention. For example, the present invention is not limited to generating a resource migration plan for reducing the application implementation costs. The concepts disclosed above may be applied to better allocate the cloud resources to provide more robust and reliable services in a cloud environment. The scope of the present invention is defined by the appended claims.

What is claimed is:

1. A management server for managing resources in a cloud system having one or more servers and one or more storage subsystems, the management server comprising:
   a processor;
   a network interface; and
   a memory,
   wherein the management server is operable to:
   assign a category of resources to a first application of a first type, the category of resources being associated with a first template of virtualized resources, the first template being associated with one or more threshold values and having a first cost for using the first template, the one or more threshold values including a first threshold value;
   monitor, while the first application of the first type is operating, performance of the first template to obtain one or more performance values for the first template, the one or more performance values obtained including a first performance value;
   compare the first performance value of the first template with the first threshold value associated with the first template; and
   generate, while the first application of the first type is operating, a first resource migration plan with a decreased cost of executing the first application of the first type compared to the first template based upon a result of the comparing step, the first resource migration plan being a plan to migrate the first application of the first type from the first template to a second template of virtualized resources,
   wherein the second template is associated with a second threshold value that is greater than the first performance value,
   wherein the second template has a second cost for using the second template that is less than the first cost,
   wherein the first template specifies first required virtualized resources, the first required virtualized resources including a first Virtual Machine (VM) type and a first storage type,
   wherein the second template specifies second required virtualized resources, the second required virtualized resources including a second VM type and a second storage type,
   wherein respective costs are defined for the first VM type, the second VM type, the first storage type, and the second storage type, and
   wherein an attribute of the first VM type is different from a corresponding attribute of the second VM type.

2. The management server of claim 1, wherein the management server is further operable to:
   implement the first resource migration plan upon receiving a command, wherein implementing the first resource migration plan includes associating the second template with the first application of the first type.

3. The management server of claim 1, wherein the first template is associated with a catalog, wherein the catalog is further associated with a third template of virtualized resources, and wherein the first template provides a processing function for the catalog and the third template provides a storage function for the catalog.

4. The management server of claim 1, wherein the first threshold value relates to any one of the following: a CPU usage, a memory usage, a disk usage, a latency value, and an TOPS (input/out per second), and wherein the one or more performance values obtained from the monitoring step relate to any one of the following: a CPU usage, a memory usage, a disk usage, a latency value, and an TOPS.

5. The management server of claim 1, wherein the first resource migration plan is generated only if none of the one or more performance values obtained from the monitoring step exceeds any of the one or more threshold values associated with the first template.

6. The management server of claim 5, wherein the one or more threshold values associated with the first template include values relating to the following: CPU usage, memory usage, disk usage, latency, and TOPS.

7. The management server of claim 1, wherein the first template is defined as a default template for a given function for a catalog, wherein the management server is further operable to:

implement the first resource migration plan, wherein implementing the first resource migration plan includes associating the second template with the first application of the first type in place of the first template; and define the second template as the default template for the given function for the catalog in place of the first template after implementing the first resource migration plan.

8. The management server of claim 7, wherein the management server is further operable to:

assign the category to a second application of the first type, the category having the second template as the default template for the given function.

9. The management server of claim 1, wherein the management is further operable to:

implement the first resource migration plan, wherein implementing the first resource migration plan includes associating the second template with the first application of the first type in place of the first template;

obtain performance values of the second template that has been associated with the first application of the first type, the second template having a plurality of threshold values including the second threshold value;

determine whether or not any of the performance values of the second template is exceeding the threshold values of the second template; and generate a second resource migration plan for a second application of the first type based upon a result of the determining step, the second resource migration plan being a plan to migrate the second application of the first type to the second template.

10. A computer-implemented method for managing resources in a cloud system, the method comprising:

assigning a category of resources to a first application of a first type, the category of resources being associated with a first template of virtualized resources, the first template being associated with one or more threshold values and having a first cost for using the first template, the one or more threshold values including a first threshold value;

monitoring, while the first application of the first type is operating, performance of the first template to obtain one or more performance values for the first template, the one or more performance values obtained including a first performance value;

comparing the first performance value of the first template with the first threshold value associated with the first template; and generating, while the first application of the first type is operating, a first resource migration plan with a decreased cost of executing the first application of the first type compared to the first template based upon a result of the comparing step, the first resource migration plan being a plan to migrate the first application of the first type from the first template to a second template of virtualized resources, wherein the second template is associated with a second threshold value that is greater than the first performance value, wherein the second template has a second cost for using the second template that is less than the first cost, wherein the first template specifies first required virtualized resources, the first required virtualized resources including a first Virtual Machine (VM) type and a first storage type, wherein the second template specifies second required virtualized resources, the second required virtualized resources including a second VM type and a second storage type, wherein respective costs are defined for the first VM type, the second VM type, the first storage type, and the second storage type, and wherein an attribute of the first VM type is different from a corresponding attribute of the second VM type.

11. The computer-implemented method of claim 10, further comprising:

implementing the first resource migration plan upon receiving a command, wherein implementing the first resource migration plan includes associating the second template with the first application of the first type.

12. The computer-implemented method of claim 10, wherein the first template is associated with a catalog, wherein the catalog is further associated with a third template of virtualized resources, wherein the first template provides a processing function for the catalog and the third template provides a storage function for the catalog, wherein the first threshold value relates to any one of the following: a CPU usage, a memory usage, a disk usage, a latency value, and an TOPS (input/out per second), and wherein the one or more performance values obtained from the monitoring step relate to any one of the following: a CPU usage, a memory usage, a disk usage, a latency value, and an TOPS.

13. The computer-implemented method of claim 10, wherein the first resource migration plan is generated only if none of the one or more performance values obtained from the monitoring step exceeds any of the one or more threshold values associated with the first template, and wherein the one or more threshold values associated with the first template include values relating to the following: CPU usage, memory usage, disk usage, latency, and TOPS.

14. The computer-implemented method of claim 10, wherein the first template is defined as a default template for a given function for a catalog, the method further comprising:
- implementing the first resource migration plan, whereby the second template is associated with the first application of the first type in place of the first template;
- defining the second template as the default template for the given function for the catalog in place of the first template after implementing the first resource migration plan; and
- assigning the category to a second application of the first type, the category having the second template as the default template for the given function.

15. The computer-implemented method of claim 10, further comprising:
- implementing the first resource migration plan, wherein implementing the first resource migration plan includes associating the second template with the first application of the first type in place of the first template;
- obtaining performance values of the second template that has been associated with the first application of the first type, the second template having a plurality of threshold values including the second threshold value;
- determining whether or not any of the performance values of the second template is exceeding the threshold values of the second template; and
- generating a second resource migration plan for a second application of the first type based upon a result of the determining step, the second resource migration plan being a plan to migrate the second application of the first type to the second template.

16. A non-transitory computer readable medium including a computer executable program for managing resources in a cloud system, the computer readable medium comprising:
- code for assigning a category of resources to a first application of a first type, the category of resources being associated with a first template of virtualized resources, the first template being associated with one or more threshold values and having a first cost for using the first template, the one or more threshold values including a first threshold value;
- code for monitoring, while the first application of the first type is operating, performance of the first template to obtain one or more performance values for the first template, the one or more performance values obtained including a first performance value;
- code for comparing the first performance value of the first template with the first threshold value associated with the first template; and
- code for generating, while the first application of the first type is operating, a first resource migration plan with a decreased cost of executing the first application of the first type compared to the first template based upon a result of the comparing step, the first resource migration plan being a plan to migrate the first application of the first type from the first template to a second template of virtualized resources,
- wherein the second template is associated with a second threshold value that is greater than the first performance value,
- wherein the second template has a second cost for using the second template that is less than the first cost,
- wherein the first template specifies first required virtualized resources, the first required virtualized resources including a first Virtual Machine (VM) type and a first storage type,
- wherein the second template specifies second required virtualized resources, the second required virtualized resources including a second VM type and a second storage type,
- wherein respective costs are defined for the first VM type, the second VM type, the first storage type, and the second storage type, and
- wherein an attribute of the first VM type is different from a corresponding attribute of the second VM type.

17. The computer readable medium of claim 16, further comprising:
- code for implementing the first resource migration plan upon receiving a command, wherein implementing the first resource migration plan includes associating the second template with the first application of the first type.

18. The computer readable medium of claim 16, wherein the first resource migration plan is generated only if none of the one or more performance values obtained from the monitoring step exceeds any of the one or more threshold values associated with the first template, and
- wherein the one or more threshold values associated with the first template include values relating to the following: CPU usage, memory usage, disk usage, latency, and TOPS.

19. The computer readable medium of claim 16, wherein the first template is defined as a default template for a given function for a catalog, the computer readable medium further comprising:
- code for implementing the first resource migration plan, whereby the second template is associated with the first application of the first type in place of the first template;
- code for defining the second template as the default template for the given function for the catalog in place of the first template after implementing the first resource migration plan; and
- code for assigning the category having the second template as the default template to a second application of the first type.

20. The computer readable medium of claim 16, further comprising:
- code for implementing the first resource migration plan, whereby the second template is associated with the first application of the first type in place of the first template;
- code for obtaining performance values of the second template that has been associated with the first application of the first type, the second template having a plurality of threshold values including the second threshold value;
- code for determining whether or not any of the performance values of the second template is exceeding the threshold values of the second template; and
- code for generating a second resource migration plan for a second application of the first type based upon a result of the determining step, the second resource migration plan being a plan to migrate the second application of the first type to the second template.

* * * * *